(No Model.)  2 Sheets—Sheet 2.
J. H. & J. D. LUCAS.
STEAM MOTOR.
No. 517,981. Patented Apr. 10, 1894.
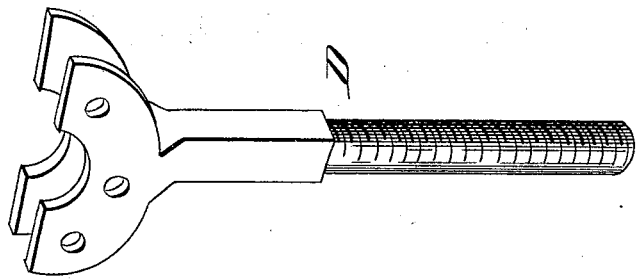
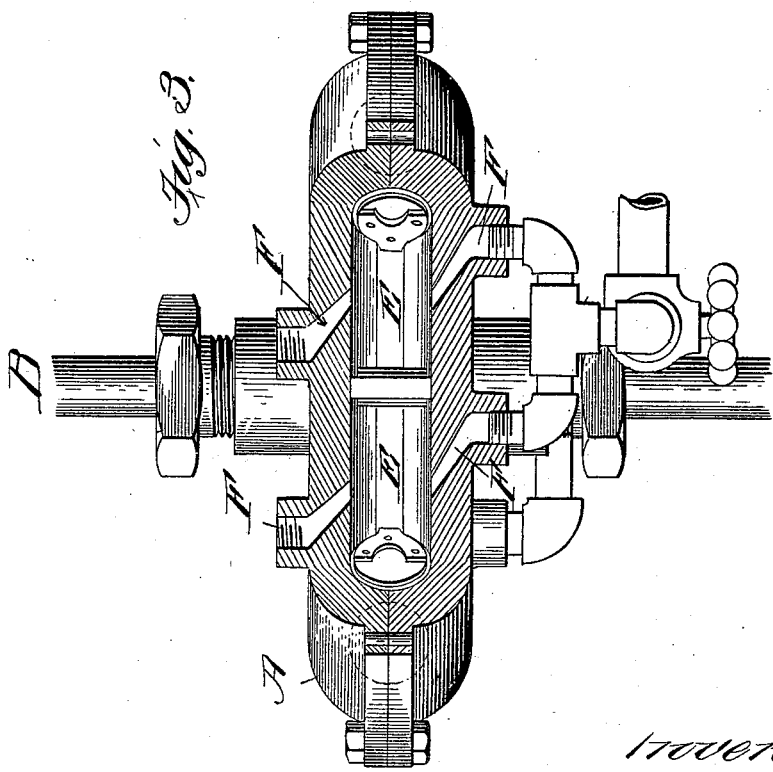

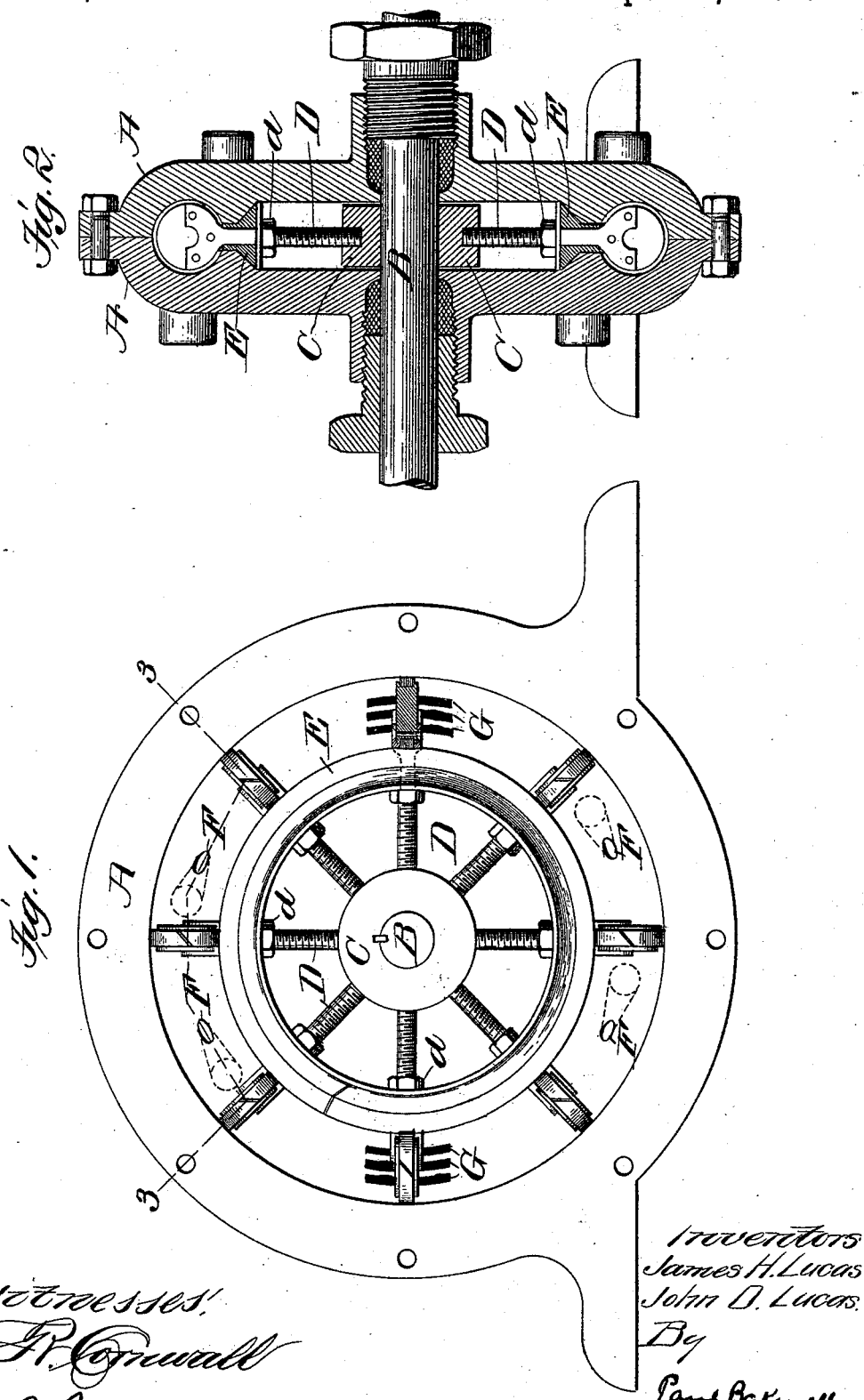

UNITED STATES PATENT OFFICE.

JAMES H. LUCAS AND JOHN D. LUCAS, OF ST. LOUIS, MISSOURI.

STEAM-MOTOR.

SPECIFICATION forming part of Letters Patent No. 517,981, dated April 10, 1894.

Application filed October 30, 1893. Serial No. 489,523. (No model.)

*To all whom it may concern:*

Be it known that we, JAMES H. LUCAS and JOHN D. LUCAS, citizens of the United States, residing in the city of St. Louis, State of Missouri, have invented a certain new and useful Improvement in Steam-Motors, of which the following is a full, clear, and exact description, reference being had to the accompanying drawings, forming a part of this specification, wherein—

Figure 1 illustrates a view in side elevation of our improved motor, one section of the casing being removed. Fig. 2 is a vertical cross sectional view. Fig. 3 is a plan view, partly in section, said section being taken on line 3—3 in Fig. 1; and Fig. 4 is a detail view of one of the piston spokes.

Our invention relates to a new and useful improvement in steam motors, and consists, generally stated, in mounting in a circular way formed by a two-part casing a series of piston heads, which are adapted to pass around in said circular opening, being impelled by the impingement of steam directed thereagainst from either one side or the other, according to the line of direction in which it is desired to obtain power.

In the drawings, A indicates the casing, which is preferably circular in shape, formed in two parts, which are clamped together by suitable bolts passing through peripheral flanges. A suitable base may also be formed on a casting, upon which the machine, when assembled, will rest to add rigidity thereto. The two halves of this casing are formed with semicircular recesses near their outer edges, so arranged that when the machine is assembled a circular annulus in which the several piston heads operate is formed. The casing is also formed with suitable journals or bearing boxes for the axle or shaft B, which shaft has mounted upon it inside the casing a hub or collar C. Extending radially from this hub or collar C, is a series of spokes D, preferably screw-threaded into said hub, so as to make them adjustable relative thereto, which spokes have their outer portion formed angular in cross-section, as indicated in Fig. 4, and terminating at their outer ends in a spreading bifurcated support, in which the cylinder head is clamped.

The squared portion of the spokes passes through a ring E, which forms part of the inner wall of the annulus, said ring being formed with tapering outer faces, so that the nuts $d$ on the spokes can, by being turned on the threaded portion of the spoke D, force the ring E outwardly, to form a tight joint with the casing, and prevent the escape of steam from the cylinders to the inner chamber. In order to facilitate the adjustment, we preferably split the ring E diagonally and arrange, upon its inner periphery, a flat strip which has its joint at some other portion.

Arranged around the sides of the annulus, so as to concentrate steam in an oblique line against one or the other sides of the pistons, are steam ports F, preferably four in this instance, so arranged that the steam injected therethrough will operate upon the cylinder heads on opposite sides of the ring E simultaneously. Suitable exhaust ports G are arranged in the length of the travel of the piston heads to permit the escape of steam contained between the heads.

The operation is as follows: The parts being assembled, as shown, and suitable mechanism being mounted upon or arranged to be driven by the shaft B, and the steam pipes running to the ports F on each side of the annulus, being connected with any suitable supply, steam is turned on so as to be admitted into one or the other side of the annulus, depending upon the direction in which it is desired to rotate the shaft B. The steam entering into the annulus through the contracted opening of the tangentially-arranged ports will be concentrated and directed in an oblique line against the piston in front of it, which impingement will force said piston-head until another piston head has passed the opening, which latter piston-head will receive the steam and be forced around likewise. The steam is thus contained between two heads, and is carried around by the action of the steam against the heads in the rear of those first-named, and when the advanced head passes the exhaust port, either on one side or the other, the contained steam will be allowed to escape, which will reduce the pressure between the several heads to that of the atmosphere, thus permitting a more positive and direct action of the injected steam against the heads in their continued forward movement.

We preferably arrange exhaust ports on either side of the cylinder and locate two injector openings between the same and on each side, by which means we obtain a greater area for the action of the steam, and, in that way, increase the power.

Having thus described our invention, what we claim, and desire to secure by Letters Patent, is—

1. In a steam motor, the combination with a divided casing having formed therein an annulus, into the sides of which open the contracted openings of tangentially disposed injector ports and from which lead suitable exhaust ports, a centrally located shaft, a piston ring mounted on the shaft, and piston heads mounted on the ring and adapted to travel around in the annulus substantially as described.

2. In a steam motor, the combination with a divided casing having formed therein an annulus, into the sides of which, at the top and bottom of the casing, lead the contracted openings of oppositely and tangentially disposed inlet ports, a centrally located shaft, a piston ring on the shaft, piston heads on the ring, which travel in the annulus, and exhaust ports leading from the annulus at a point midway between the position of the entrance openings of the inlet ports, substantially as described.

3. In a steam motor, the combination with a divided casing forming an annulus into which suitable injector ports lead, and from which suitable exhaust ports lead, a centrally-located shaft, a collar on said shaft, a piston ring having an adjustable connection with said collar through the medium of threaded bolts and nuts forming spokes, said spokes being formed on their outer ends with a squared portion which passes through the ring, and a flaring bifurcated extremity which extends into the annulus, and piston-heads which are secured in said bifurcation of the spokes, substantially as described.

4. In a steam motor, the combination with a divided casing forming a circular steam cylinder, of tangentially arranged inlet ports formed with contracted openings opening into the side of the cylinder, said openings being arranged in pairs at the top and bottom of the casing, the pairs on each side pointing in opposite directions, exhaust ports located midway between the pairs of inlet ports, a centrally located shaft, a piston ring on the shaft, and piston heads on the ring, substantially as described.

In testimony whereof we hereunto affix our signatures, in presence of two witnesses, this 26th day of October, 1893.

JAMES H. LUCAS.
JOHN D. LUCAS.

Witnesses:
F. R. CORNWALL,
HUGH K. WAGNER.